H. C. WIERTH.
BAKING PAN.
APPLICATION FILED AUG. 9, 1919.
1,338,344.
Patented Apr. 27, 1920.
2 SHEETS—SHEET 1.
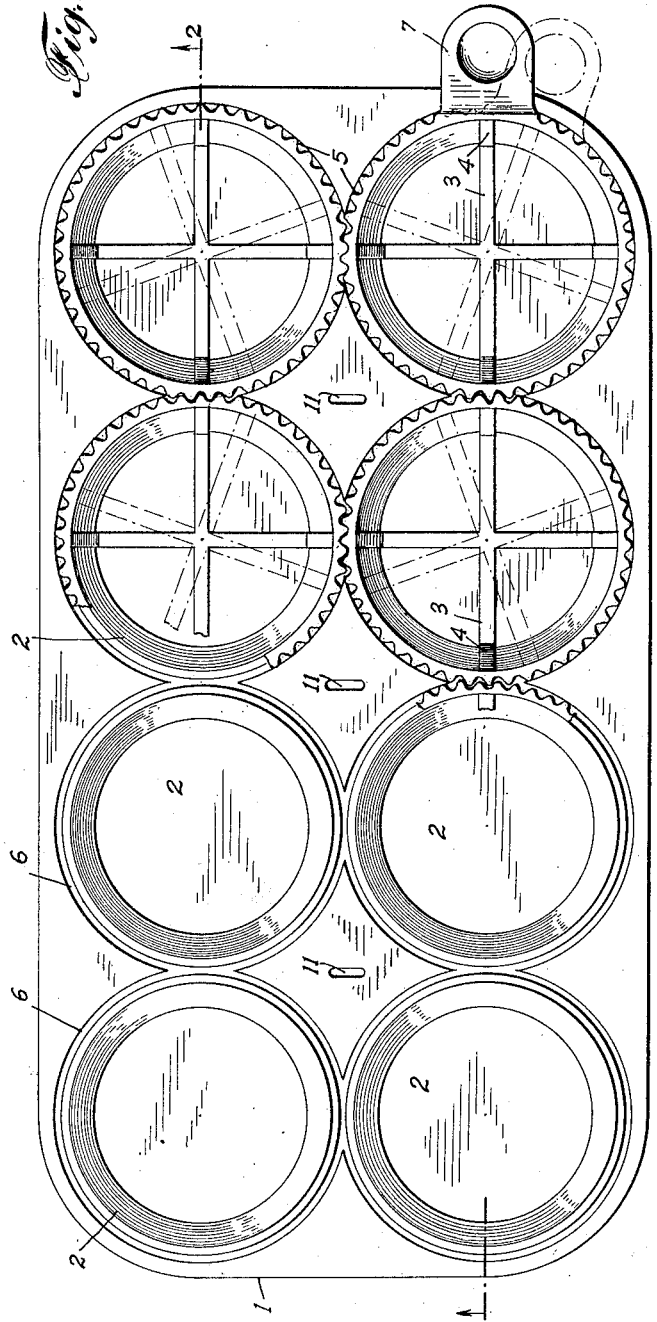
Inventor
Harold C. Wierth
By his Attorney
Jas. H. Griffin.

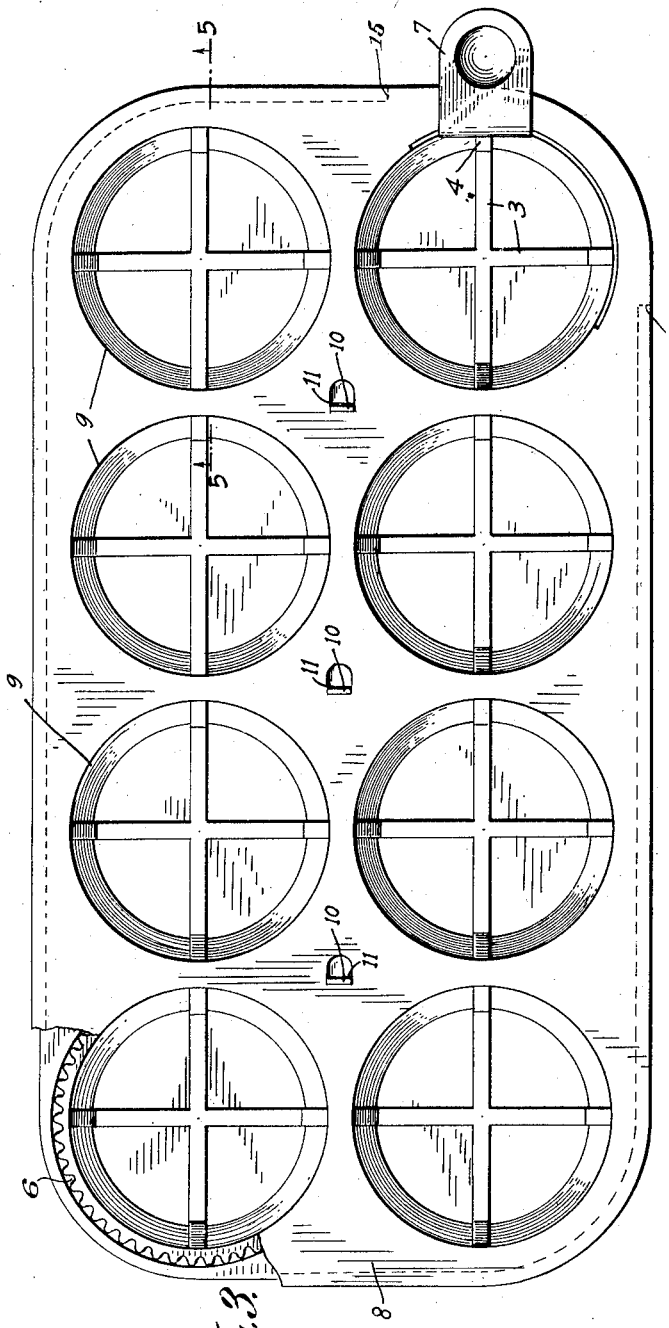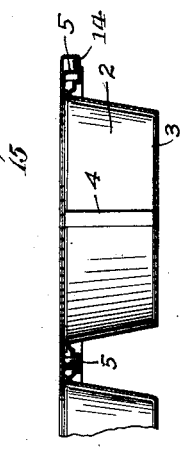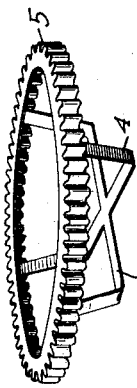

UNITED STATES PATENT OFFICE.

HAROLD C. WIERTH, OF BROOKLYN, NEW YORK.

BAKING-PAN.

1,338,344.  Specification of Letters Patent.  Patented Apr. 27, 1920.

Application filed August 9, 1919. Serial No. 316,458.

*To all whom it may concern:*

Be it known that I, HAROLD C. WIERTH, a citizen of the United States, residing at Brooklyn, county of Kings, and State of New York, have invented a certain new and useful Baking-Pan, of which the following is a specification.

This invention is a baking pan, and while the invention is adapted for use with baking pans of various kinds, it is particularly adapted for employment in muffin pans.

In muffin pans as now constructed, the pans are made with a plurality of depressions, each of which is adapted to contain enough dough to make a single muffin, and these pans are usually formed with from three to six of such depressions, whereby a quarter or half a dozen muffins are adapted to be baked at a time in a single pan. It is not uncommon in the baking of muffins, for the muffins to stick in their respective depressions, and, when they so stick it is difficult to remove them from the pans without breaking or destroying the muffins.

With the foregoing considerations in mind, the object of the present invention is to embody in a muffin pan means whereby all of the muffins therein may, at the conclusion of the baking operation, be simultaneously released from the pan so that when the pan is inverted the muffins will freely fall out of their respective depressions without breakage or destroying of any muffin.

Features of the invention, other than those specified, will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1 is a plan view of a muffin pan embodying the present invention, portions of the operating parts of the pan being omitted in the interest of clearness.

Fig. 2 is a section on the line 2—2, of Fig. 1.

Fig. 3 is a plan view of a pan with a portion of the cover broken away in the interest of clearness.

Fig. 4 is a perspective view of scraper mechanism adapted to be associated with each depression of the pan; and Fig. 5 is a section on the line 5—5 of Fig. 3.

Referring to the drawings 1 designates a plate forming the body of the pan, and this plate is provided with a number of depressions 2, which may be stamped integral with the plate 1, but are preferably formed separate and welded or otherwise secured to said plate. It is in the depressions 2 that the dough for the muffins is deposited prior to placing a pan in the oven for the baking operation. In accordance with the present invention each depression 2 is provided with a scraper and all of the scrapers are so associated with one another that they may be simultaneously rotated within their respective depressions to release such muffins as have a tendency to stick to the pan. One of the scrapers is shown in detail in Fig. 4 of the drawings. The scraper is preferably stamped up from a single piece of material, although it may be formed from a plurality of parts properly assembled, and embodies a pair of diagonal scraping elements 3 and 4 with which is rigidly associated a gear 5. The scraping elements 3 and 4 are of such shape and proportions that when the scraper is dropped into one of the depressions said elements will conform with the contour of such depression, while the gear 5 is adapted to be housed in an annular depressed channel 6, one of which is formed in the plate 1 concentric with each depression therein. The depressions are so spaced apart and the gears 5 so proportioned that when the scrapers are dropped into place in their respective depressions the gears of adjacent scrapers will mesh with one another after the manner shown in Figs. 1 and 2, so that through the rotation of one of said scrapers, all of the scrapers are simultaneously rotated. In practice, rotary movement may be imparted to the scrapers by providing one of them with an actuating knob or finger piece 7, as shown in Fig. 1, and through the manipulation of this finger piece from the full to the dotted line position, rotation will be simultaneously imparted to all of the scrapers and the muffins will be freed from the respective depressions.

While the muffin pan may be used as complete as thus far described, it is preferable that a suitable cover plate be employed to preclude dough from getting into the gears and to facilitate the cleaning or washing of the pan. Such a cover plate is shown in Fig. 3 and designated by the reference numeral 8. The cover plate overlies the entire pan but is provided with an opening 9 juxtaposed with each of the depressions so that in placing dough in the depressions it is introduced thereinto through the openings 9, which are sufficiently small to insure complete housing of the gears 5. The cover plate 8 is secured to the pan proper preferably by beading over its marginal edges over the marginal edges of the plate 1, as shown at 14 in Fig. 5, and through the further employment of fingers 10 stamped up from the plate 1 as shown in Fig. 1. These fingers are adapted to pass through slots 11, in the cover plate 8, and are thereafter bent over after the manner shown in Fig. 3 to hold the cover plate 8 down to the plate 1. It will, of course, be understood that the marginal beading of the cover plate is cut away adjacent the finger piece 7, as shown at 15, so as to allow of the operation of such finger piece in the manner described.

The pan of the present invention is the first, so far as I am aware, embodying a plurality of depressions each of which is provided with its own scraper and all of which scrapers may be simultaneously operated from a common point of applied force. While the invention is not limited to a muffin pan it is particularly adapted in the baking of this particular kind of cake.

It will, of course, be understood that a pan embodying the present invention may have any number of a plurality of depressions but in any instance the scrapers of successive depressions are geared together for simultaneous operation. It is also within the scope of this invention to make a relatively large pan with a large number of depressions and operate the scrapers in series as this would be merely a duplication of the structure shown in Fig. 1.

Having thus fully described the invention, what I claim as new and desire to secure by Letters Patent is:

1. A baking pan embodying a plurality of depressions adapted for the reception of dough, a scraper positioned in each depression, a gear associated with each scraper and meshing with the gears of the adjacent scrapers and means for imparting rotary movement to one of said scrapers, whereby all of the scrapers are simultaneously rotated.

2. A baking pan embodying a plurality of depressions adapted for the reception of dough, a scraper positioned in each depression, a gear associated with each scraper and meshing with the gears of the adjacent scrapers, means for imparting rotary movement to one of said scrapers, whereby all of the scrapers are simultaneously rotated and a cover plate for said pan adapted to house the gears of the respective scrapers, said cover plate being provided with openings registering with the depressions of the pan and through which openings dough may be deposited in said depressions.

3. A baking pan embodying a plurality of depressions, adapted for the reception of dough, a scraper in each of said depressions, a gear associated with each scraper and seated in an annular channel formed in the pan concentric with each depression, a gear of each scraper meshing with the gears of adjacent scrapers, and means for simultaneously operating all of the gears to impart simultaneous rotation to all of the scrapers.

4. A baking pan embodying a plurality of depressions, adapted for the reception of dough, a scraper in each of said depressions, a gear associated with each scraper and seated in an annular channel formed in the pan concentric with each depression, a gear of each scraper meshing with the gears of adjacent scrapers, means for simultaneously operating all of the gears to impart simultaneous rotation to all of the scrapers, in combination with a cover plate adapted to cover the gears of the respective scrapers but provided with openings through which dough may be deposited in the depression in the pan.

5. A baking pan embodying a plurality of depressions, a scraper in each depression, said scraper embodying a pair of diagonal knives conforming to the cross sectional contour of the depressions and secured at their opposite ends to a gear, an annular channel surrounding each depression for housing the gears, said channel being tangential to one another whereby the gears of adjacent scrapers mesh with one another, means associated with one of the scrapers for simultaneously rotating all of said scrapers.

6. A baking pan embodying a plurality of depressions, a scraper in each depression, said scraper embodying a pair of diagonal knives conforming to the cross sectional contour of the depressions and secured at their opposite ends to a gear, an annular channel surrounding each depression for housing the gears, said channel being tangential to one another whereby the gears of adjacent scrapers mesh with one another, means associated with one of the scrapers for simultaneously rotating all of said scrapers, in combination with a cover plate positioned to overlie the pan and secured thereto, said cover plate being provided with openings registering with the depressions in the pan and through which openings dough may be deposited within the depressions.

7. A baking pan embodying a plurality of depressions in each of which is seated a scraper, a gear associated with each scraper with the gears of adjacent scrapers meshing with one another, means for simultaneously operating all of the scrapers, a cover plate provided with openings registering with the depressions of the pan and through which openings dough may be deposited within the depressions and means for simultaneously securing the cover plate to the pan and precluding inadvertent displacement of the scrapers from their respective depressions.

In testimony whereof I have signed my name to this specification.

HAROLD C. WIERTH.